United States Patent
Ulu et al.

(10) Patent No.: US 11,639,023 B2
(45) Date of Patent: May 2, 2023

(54) INTERACTIVE DESIGN TOOL FOR VARYING DENSITY SUPPORT STRUCTURES

(71) Applicant: PALO ALTO RESEARCH CENTER INCORPORATED, Palo Alto, CA (US)

(72) Inventors: Nurcan Gecer Ulu, Sunnyvale, CA (US); Erva Ulu, Sunnyvale, CA (US); Walter Hsiao, San Mateo, CA (US); Jiahao Li, Los Angeles, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 154 days.

(21) Appl. No.: 17/156,356

(22) Filed: Jan. 22, 2021

(65) Prior Publication Data

US 2022/0234279 A1 Jul. 28, 2022

(51) Int. Cl.
 *B33Y 50/02* (2015.01)
 *B29C 64/118* (2017.01)
 (Continued)

(52) U.S. Cl.
 CPC .......... *B29C 64/118* (2017.08); *B29C 64/124* (2017.08); *B29C 64/393* (2017.08);
 (Continued)

(58) Field of Classification Search
 CPC .................................................... B33Y 50/02
 See application file for complete search history.

(56) References Cited

U.S. PATENT DOCUMENTS

| 10,719,301 B1 * | 7/2020 | Dasgupta ............. G06K 9/6267 |
| 2007/0233298 A1 | 10/2007 | Heide et al. |

(Continued)

FOREIGN PATENT DOCUMENTS

WO 2014/207454 A1 12/2014

OTHER PUBLICATIONS

Author Unknown, "UnrealMeshProcessingTools," GRADIENTSPACE Tutorials Open Source, downloaded on Jul. 27, 2021 from https://web.archive/org.web/20200606001620/http://www.gradientspace.com/opensource, 2 pages.

(Continued)

*Primary Examiner* — Suresh Suryawanshi
(74) *Attorney, Agent, or Firm* — MH2 Technology Law Group LLP

(57) ABSTRACT

A system for interactively designing a support structure for a three-dimensionally printed object having user-defined surface quality, the system including a processor and a non-transitory computer-readable medium communicatively coupled to the processor and storing instructions executable by the processor is provided. When executed, the instructions cause the processor perform operations including receiving a digital model of the object to be three-dimensionally printed, receiving user input related to a desired surface quality at one or more portions of the digital model, determining a printing orientation of the object based on the digital model and the user input; determining a support layout for the object, based on the printing orientation and the user input, and transmitting the support layout, the printing orientation, and the digital model to a three-dimensional printer.

18 Claims, 12 Drawing Sheets

(51) Int. Cl.
   B29C 64/40      (2017.01)
   B29C 64/393     (2017.01)
   B29C 64/124     (2017.01)
   B33Y 30/00      (2015.01)
   B33Y 10/00      (2015.01)

(52) U.S. Cl.
   CPC .............. *B29C 64/40* (2017.08); *B33Y 50/02* (2014.12); *B33Y 10/00* (2014.12); *B33Y 30/00* (2014.12)

(56) References Cited

U.S. PATENT DOCUMENTS

| | | | | |
|---|---|---|---|---|
| 2013/0066812 | A1* | 3/2013 | Nehme | B29C 64/40 |
| | | | | 700/106 |
| 2014/0303942 | A1* | 10/2014 | Wighton | B29C 64/165 |
| | | | | 703/1 |
| 2015/0367576 | A1 | 12/2015 | Page | |
| 2016/0085882 | A1* | 3/2016 | Li | G05B 19/4099 |
| | | | | 703/1 |
| 2017/0277168 | A1 | 9/2017 | Tanaka et al. | |
| 2019/0079491 | A1* | 3/2019 | Barua | B22F 10/30 |

OTHER PUBLICATIONS

Jobard et al., "Creating Evenly-Spaced Streamlines of Arbitrary Density," ResearchGate, Dec. 1997, 14 pages.

Kirkpatrick et al., "Optimization by Simulated Annealing," Science, May 13, 1983, vol. 220, No. 4598, pp. 671-680.

Author Unknown, "Improve Your Print Quality With Powerful 3D Printing Software," Professional 3D Printing Software | Simplify3D, downloaded on Jul. 27, 2021 from https://web.archive.org/web/20200419161516/https://www.simplify3d.com, 3 pages.

Author Unknown, "Ultimaker Cura: Power, Easy-to-Use 3D Printing Software," product brochure, downloaded on Jul. 27, 2021 from https:web.archive.org/web/20200503010318/https://ultimaker.com/software/ultimaker-cura, 9 pages.

Zhang et al., "Perceptual Models of Preference in 3D Printing Direction," ACM Transactions on Graphics, vol. 34, No. 6, article 215, Nov. 2015, 12 pages.

Extended European Search Report dated Jun. 27, 2022 in related European Application No. 22150291.7 (11 pages).

Delfs et al., "Optimized Build Orientation of Additive Manufactured Parts for Improved Surface Quality and Build Time," Additive Manufacturing 12 (2016) 314-220.

Ga et al., "Methodology for Part Building Orientation in Additive Manufacturing," Computer-Aided Design and Applications, 16(1), 2019, 113-128.

Ulu et al., "Curvy: An Interactive Design Tool for Varying Density Support Structures," arXiv:2102.10013v1 [cs.GR], Feb. 19, 2021, 12 pages.

3D Printerly, "10 Ways How to Fix A Poor/Rough Surface Above 3D Print Supports," downloaded on Jun. 22, 2022 from https://web.archive.org/web/20201024152656/https://3dprinterly.com/how-to-fix-a-poor-rough-surface-above-3d-print-supports/, 11 pages.

\* cited by examiner

INTERACTIVE DESIGN TOOL FOR VARYING DENSITY SUPPORT STRUCTURES

FIELD OF THE DISCLOSURE

The present disclosure relates to three-dimensional printing design tools, and more particularly to systems and methods directed to linking user input to surface finish of a three-dimensionally printed object.

BACKGROUND OF THE DISCLOSURE

In many three-dimensional ("3D") printing approaches, support structures play an important role in successful printing by supporting portions of a printed object (e.g., overhang regions) to prevent collapse of such portions, for example, as a result of gravity. While the support structures may aid in supporting the printed object, these auxiliary structures can result in undesirable effects such as, for example, damage the surface and reduced quality, thereby resulting in visual as well as functional artifacts. Such artifacts are often unavoidable especially in widely used methods, such as, for example, single material Fused Deposition Modeling (FDM) processes, as there may be a delicate balance between the amount of supports and the resulting surface quality.

Excessive use of supports, while providing additional protection from collapse, can often result in adhesion of the support to one or more surfaces of the models and, thereby, blemishes can be left on the surfaces. On the other hand, when an insufficient number of supports are implemented, sagging and other object deformation can occur, for example, between support points due to an increased bridging distance.

Many 3D printing applications available in the market provide automated means to design support structures when printing a 3D object. However, supports designed and printed by existing applications still result in support placement that can render surface quality suboptimal, even for simple shapes. In addition, user involvement for alleviating quality issues in existing applications is generally very low level and tedious, including, for example, manually indicating placement of individual support pillars, local adjustments of support patterns, and individual support structure orientation and spacing. Although such adjustments are often attainable for experienced designers, time is lost in performing the operations desired.

SUMMARY OF THE DISCLOSURE

The present inventors have recognized that it may be desirable to provide a tool enabling improved surface finish quality of a three-dimensionally ("3D") printed objects prepared by less experienced users, who may be unable to create an adequate support layout for a printed object. It is further desirable to improve the user experience with regard to such printing thereby promoting user convenience.

According to embodiments of the present disclosure, a system for interactively designing a support structure for a three-dimensionally printed object having user-defined surface quality, the system including a processor and a non-transitory computer-readable medium communicatively coupled to the processor is provided. The non-transitory computer-readable medium stores instructions executable by the processor to cause the processor to carry out operations including receiving a digital model of the object to be three-dimensionally printed, receiving user input related to a desired surface quality at one or more portions of the digital model, determining a printing orientation of the object based on the digital model and the user input, determining a support layout for the object, based on the printing orientation and the user input, and transmitting the support layout, the printing orientation, and the digital model to a three-dimensional printer.

By providing systems according to the present disclosure, inexperienced as well as advanced users can more easily print three-dimensional objects with high surface quality in desired areas of the object. Because the support layer is automatically generated by the design tool, the user experience and convenience can be improved.

The operations may further include providing a representation of the digital model to the user via a graphical user interface, and receiving the user input based on interaction of the user with the representation via the graphical user interface.

The operations may further include providing a saliency map on the representation based at least on a user preference and one or more curves present on the digital model.

The saliency map may be hidden based on the user preference.

The operations may further including displaying, on the representation, a gradient map corresponding to anticipated surface quality of at least a portion of the object.

The operations may further include providing a real-time estimate of a material cost for printing of the object based on the support layout, the printing orientation, and the digital model.

The operations may further include receiving user input of a desired weight ratio corresponding to a surface quality to support area, and optimizing the support layout based on the weight ratio.

In the support layout, a support structure density may correspond directly with an indication of surface quality.

The support layout may include one or more support structures conforming, at least in part, to one or more curves of the object.

The three-dimensional printer may be selected from a fused filament fabrication printer, a fused deposition modeling printer, a stereolithography printer, and a direct energy deposition printer.

According to further embodiments of the present disclosure, a method for interactively designing a support structure for a three-dimensionally printed object having user-defined surface quality, is provided. The method includes receiving a digital model of the object to be three-dimensionally printed, receiving user input related to a desired surface quality at one or more portions of the digital model, determining a printing orientation of the object based on the digital model and the user input, determining a support layout for the object, based on the printing orientation and the user input, and transmitting the support layout, the printing orientation, and the digital model to a three-dimensional printer.

The method may further include providing a representation of the digital model to the user via a graphical user interface, and receiving the user input based on interaction of the user with the representation via the graphical user interface.

The method may further include providing a saliency map on the representation based at least on a user preference and one or more curves present on the digital model.

The method may further include hiding the saliency map based on a user selection.

The method may further include displaying, on the representation, a gradient map corresponding to anticipated surface quality of at least a portion of the object.

The method may further include providing a real-time estimate of a material cost estimate for printing of the object based on the support layout, the printing orientation, and the digital model.

The method may further include receiving user input of a desired weight ratio corresponding to a surface quality to support area, and optimizing the support layout based on the weight ratio.

In the support layout, a support structure density may correspond directly with an indication of surface quality.

The support layout may include one or more support structures conforming, at least in part, to one or more curves of the object.

The three-dimensional printer may be a fused filament fabrication printer or a fused deposition modeling printer.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

The disclosed embodiments may provide one or more of the features and benefits mentioned above and/or various additional and/or alternative features and benefits that will be made apparent herein.

According to embodiments of the present disclosure, toolpaths for three-dimensional ("3D") printing of an object are constructed as connected streamlines generated in a bidirectional field created inside a support polygon. The streamlines are generated based on various components including, but not limited to, user indicated surface quality characteristics and an optimized print orientation. As used herein, the term "surface quality characteristics" shall be understood to mean a desired level of quality for an area of surface of the object 100 following printing thereof. In other words, surface quality characteristics may indicate a desired high quality surface in some areas of the object 100, low quality surface in other areas of object 100, and other varied surface quality in other areas of object 100 based on the user's indications. For example, high quality may correspond to a desired roughness ranging between ISO grades N4-N6, with low quality corresponding to a desired roughness ranging between ISO grades N9-N12.

Figure 1:
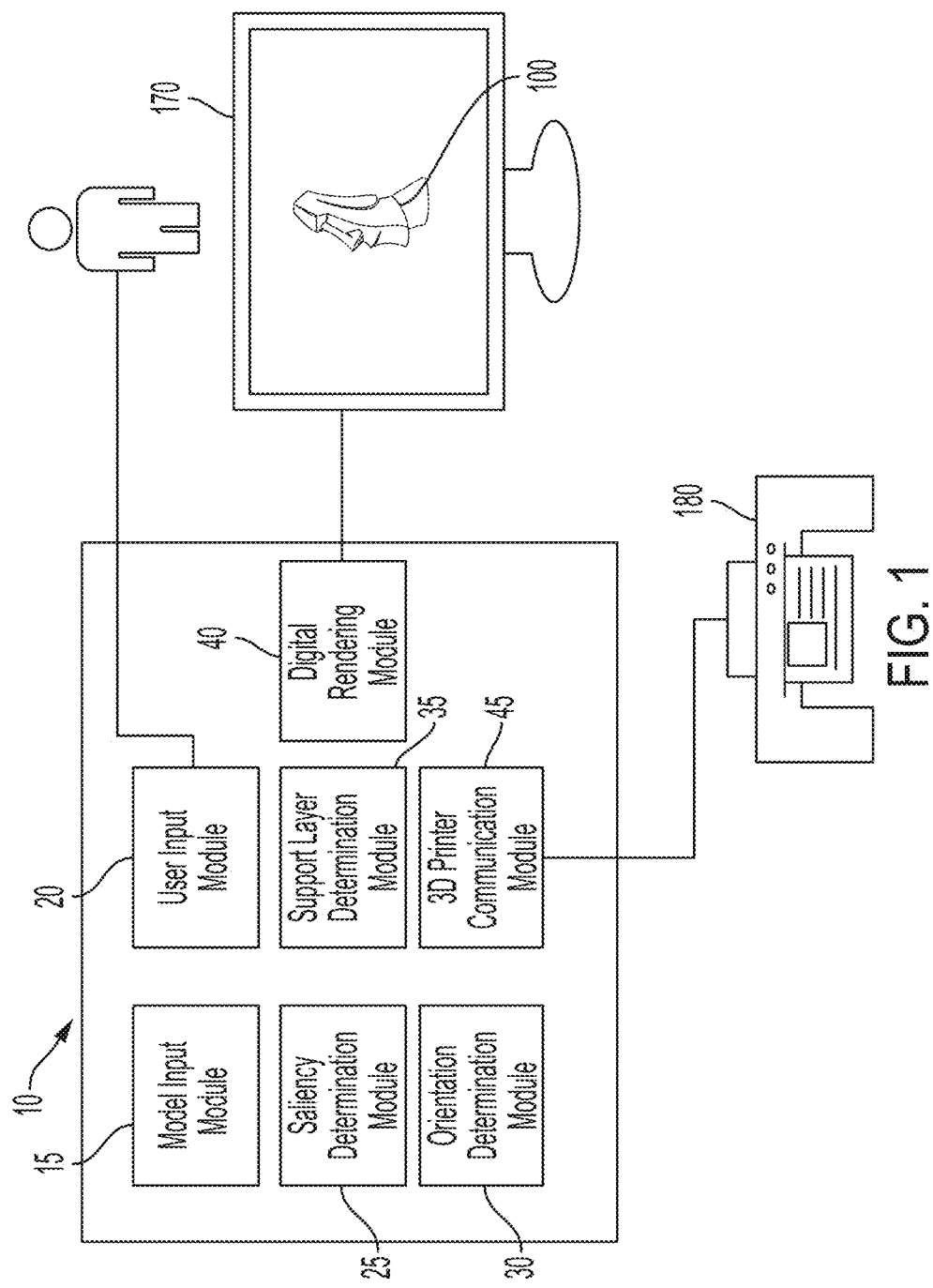
FIG. 1 is an illustrative system for printing three-dimensional ("3D") objects according to embodiments of the present disclosure.
Figure 5:
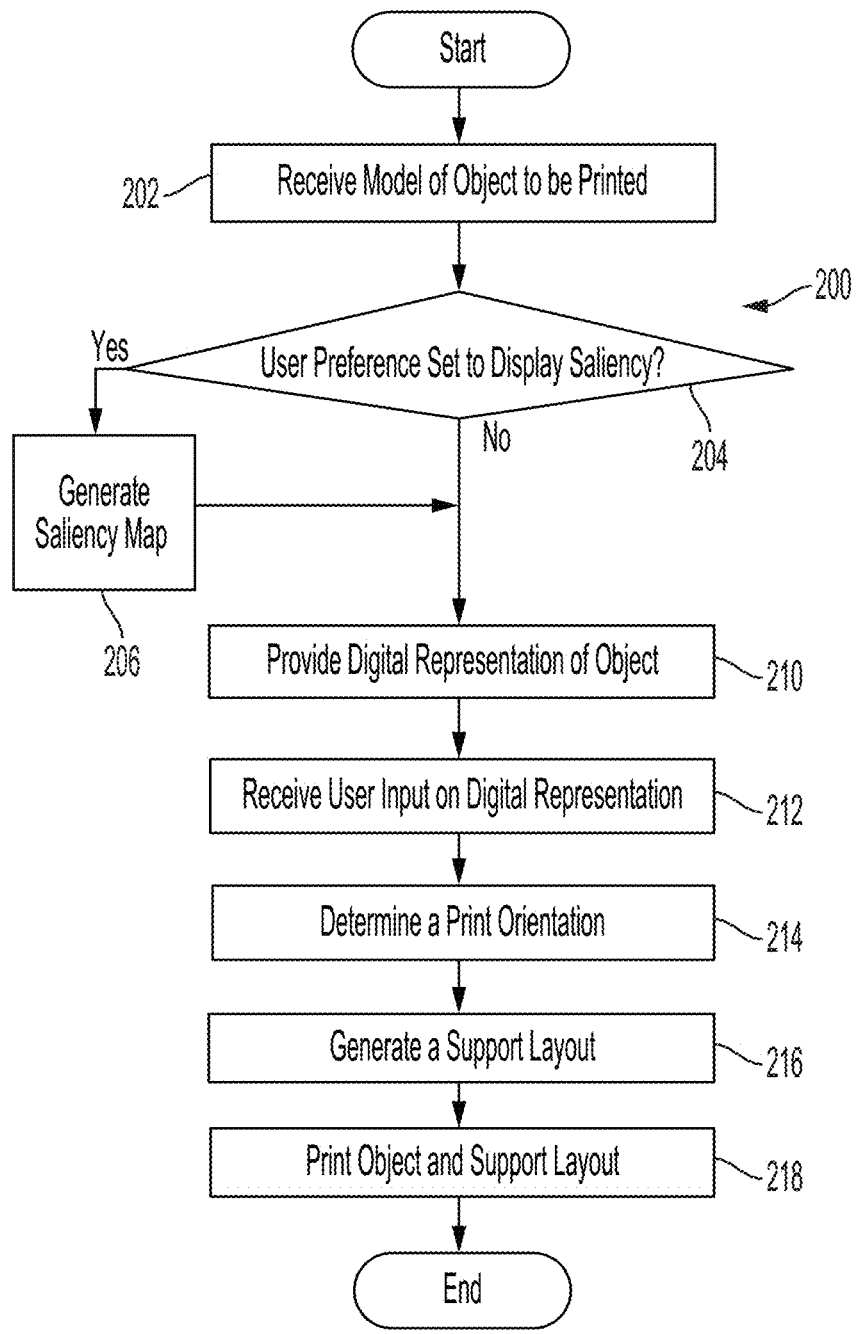
FIG. 5 show a flowchart illustrating a method for generating varying density support structures for 3D printed objects.

FIG. 1 is an illustrative system 10 for printing three-dimensional ("3D") objects 100 according to embodiments of the present disclosure, while FIG. 5 show a flowchart 200 illustrating a method for generating varying density support structures for 3D printed objects. FIG. 5 will be referenced in conjunction with various other figures throughout the disclosure to correlate steps of FIG. 5 with the processes carried out by the system 10.

System 10 may be implemented on any suitable computing device, such as, for example, a personal computer. System 10 may comprise a processor and a non-transitory memory, as will be described in greater detail below, the memory storing instructions related to one or more software modules for carrying out functions of the present disclosure. According to some embodiments, system 10 may comprise a model input module 15, a user input module 20, a saliency determination module 25, an orientation determination module 30, a support layer determination module 35, a digital rendering module 40, and a 3D printer communication module 45, among others. System 10 may further comprise a display 170 and a 3D printer 180, for example, a fused filament fabrication printer and/or a fused deposition modeling printer.

Model input module 15 may be configured to enable receiving and/or digitization of an object 100 to be 3D printed (step 202). The object 100 to be 3D printed may be any 3D object that a user desires to print, and may include various contours 110, overhangs 120, and other features leading to a visually perceptible object. For purposes of the present disclosure, it is assumed that a user desires to three-dimensionally print a figurine, for example, a game figurine, wherein the facial features and head area of the figurine are desired to have surface quality characteristics corresponding to a highest surface quality, with the remainder of the figurine having surface quality that is of limited importance. In other words, surface quality characteristics of areas of the figurine vary based on desires of the user and a marketed audience.

According to embodiments of the present disclosure, a 3D scanner (not shown) in communication with model input module 15 may be used to create a digital representation of the object 100 for purposes of printing additional objects 100. According to another example, design software such as a computer aided drafting ("CAD") tool may be used to design, in three dimensions, the object 100, may be implemented by model input module 15. Thereby, a digital version of a 3D object to be printed can be generated by a user, and subsequently manipulated according to the present disclosure. One of skill in the art understands that various methods for creating and/or obtaining a digital version of a 3D object exist, and any such method is intended to fall within the scope of the present disclosure.

Figure 2A:
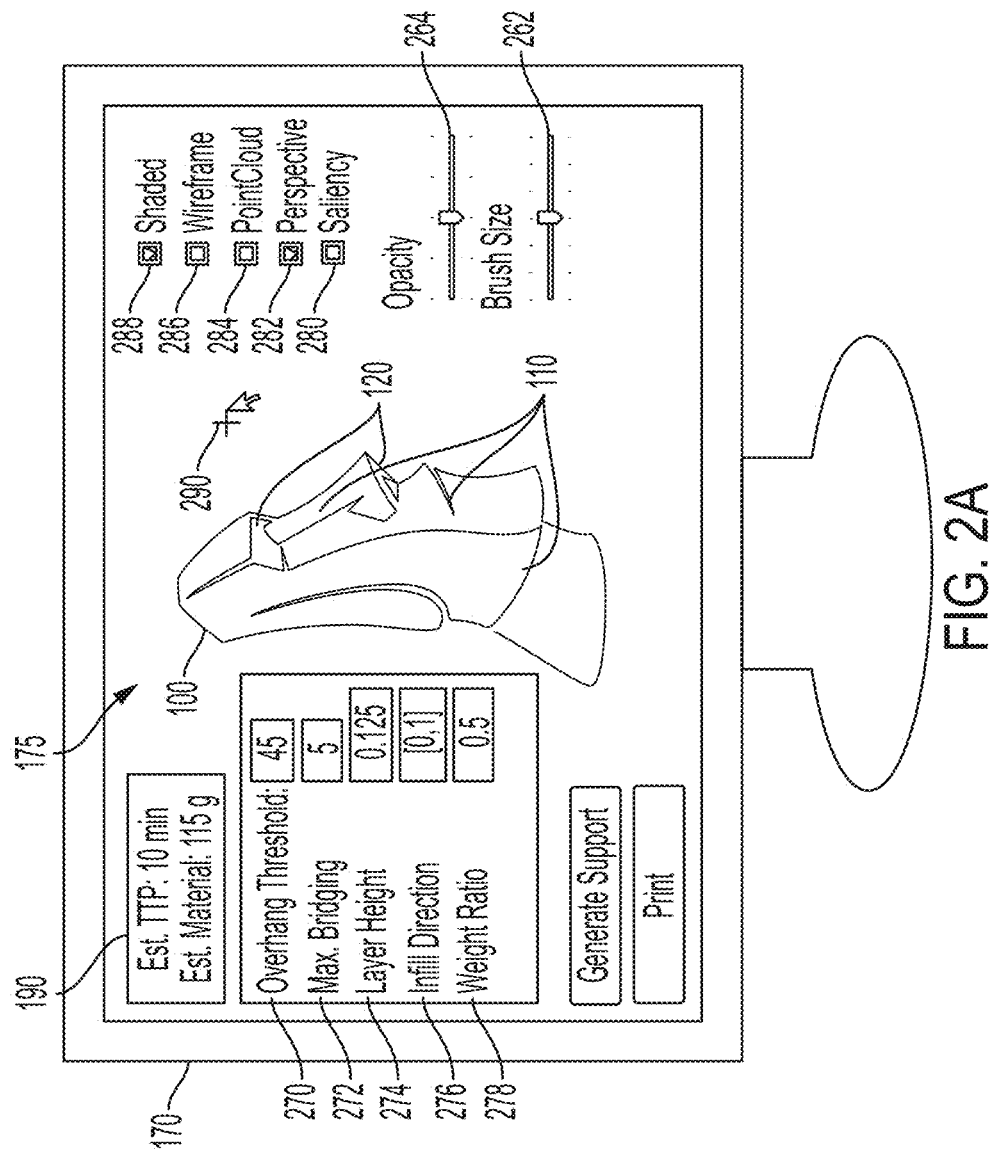
FIG. 2A is an illustration of a digitized representation of an object ready for accepting user input related to surface quality characteristics via an interface.

FIG. 2A is an illustration of a digitized representation of an object ready for accepting user input related to surface quality characteristics via an interface 175. Digital rendering module 40 is configured to display to a user, for example, via the interface 175 on the display unit 170, digital representation of the object 100 to be 3D printed as well as an interface for use by the user to indicate desired surface quality characteristics of the object 100, among others.

The interface 175 may include various controls and informational displays enabling a user to, for example, interact directly with the digital representation of object 100 to indicate user preferences and desires with regard to printing of the object, and informing the user regarding printing of the object. According to some embodiments, interface 175 may be configured to provide real-time estimates during user interaction, the estimates being related to print time and material cost, among others. For example, one or more label and/or textbox controls (not shown) may be provided in which information such as material cost is displayed as a user makes changes to surface quality directly on the digital representation displayed in interface 175.

Further, interface 175 may include one or more checkboxes 280-288, sliders 262-264, and cursors 290, enabling a user to change the view/appearance of the digital representation and to input information (e.g., desired quality information) related to the object 100 to be printed. The controls mentioned and described herein are exemplary only, and any other suitable controls for carrying out the processes noted may be implemented without departing from the scope of the present disclosure. For example, a slider may be interchangeable with a knob-type control and a checkbox may be interchangeable with the drop down or list selection-type control. In addition, more or fewer controls may be presented on the interface 175 without departing from the scope of the present disclosure, and certain controls presented may be enabled or disabled as desired by a user, for example, to simplify the interface and/or printing procedure.

Brush size slider 262 may be configured to enable a user to adapt the size of cursor 292 to include more or less area when actuating features of cursor 290. For example, sliding brush size slider 262 to the left may reduce the area of coverage of cursor 290, while sliding brush size slider 262 to the right may increase the area of coverage of cursor 290. Such functionality may be useful, for example, for indicating smaller or larger areas of quality on the digital representation of object 100.

An opacity slider 264 may be configured to change an opacity of a "paint effect" used for displaying a saliency map 250 and/or surface quality fields as defined by a user, among others. For example, depending on a level of "opacity" indicated by opacity slider 264, areas of the saliency map and/or user input quality characteristics may be made more or less opaque relative to the representation of object 100 displayed within interface 175.

Thus, by sliding opacity slider 264 to the left (i.e., to a lower level), quality indications made with cursor 290 on or around object 100 may be rendered less important (i.e., lower quality relative to surrounding areas), while also reducing opacity of the paint effect strokes on the displayed object 100. Similarly, by sliding opacity slider 264 to the right, quality indications undertaken with cursor 290 on or around object 100 may be correlated with higher importance and higher surface quality on the final printed object 100, while the opacity of the paint effect of the strokes may be increased on the displayed object 100.

Text controls 270-278 may be configured to enable direct user input for variables used in connection with performance of operations carried out herein and used as described below. For example, text controls 270-278 may enable a user to control variable values described below related to creation of an optimized print orientation, a support layout, and 3D print functionality among others. According to some embodiments text controls 270-278 may be available to a user based on a user selected preference, for example, where the user is an expert user the text controls 270-278 may be available to the user for data entry. In contrast, inexperienced users may indicate a desire to have the variable data prefilled with "typical" values to facilitate easy printing of the object 100 with minimal user input.

Overhang threshold text control 270 may be configured to accept angular input indicating a threshold overhang angle, $\varphi_t$ used during, for example, overhang calculations in determining required support areas of the printed object 100, as well as an optimized print orientation for the object 100. According to some embodiments, the threshold overhang angle, $\varphi_t$, may be set by default to a value ranging between about 40 and 50 degrees, for example, 45 degrees. However, a user may desire to customize this value depending on the capabilities of the 3D printer being used, for example, to allow surfaces to be 3D printed without requiring support structures. In other words, the number of supports varies inversely to an angle that an implemented 3D printer can print without requiring support.

Maximum bridging text control 272 may be configured to receive input from the user regarding the maximum bridging distance for determined supports. Smaller spacing between support toolpaths (i.e., lower maximum bridging distance) may provide a higher quality bridging, thereby resulting in better surface quality. However, the smaller spacing increases an amount of material used for supports as well as the overall print time. Therefore, by enabling a user to customize this value, a desired balance can be obtained between cost, print time, and surface quality. Maximum bridging may be set to a default value ranging between 3 and 10 mm, for example, 5 mm, and an inexperienced user may elect to use the default value.

Layer height text control 274 may be configured to enable a user to set a height value for layers of the object during the slicing operation. For example, the object 100 may be cut into relatively thin slices that represent each layer of the 3D printing operation and support paths are computed for each such layer. Layer height may, thereby, affect a distance between two consecutive layers $S^i$ and $S^{i+1}$ shown in FIG. 4A. In general, choosing a small layer height results in higher surface quality throughout object 100, however, smaller layer heights may increase print time for the object, and a user may determine a desired balance based on these factors. Layer height may vary according to the type of printing hardware used, and may be initially set based on such printing hardware. For example, according to one 3D printer that may be used, a default value ranging between about 0.100 mm and 0.150 mm, for example, 0.125 mm may be set for the layer height.

Infill direction text control 276 may be configured to receive input as a 2D vector in x-y Cartesian space or as a degree of an angle between the infill direction and s-axis. Support toolpaths may be improved when such toolpaths are made orthogonal to the toolpaths that they are intended to support. Therefore, infill direction information provided or set using the infill direction text control may be used to compute the direction of the support toolpaths such that perpendicularity to the infill direction is maximized Weight ratio text control 278 may be configured to enable a user to input a desired weight ratio ω between 0 and 1. Weight ratio may default to 1, and may therefore be configure to provide maximum surface quality corresponding to a user's indicated quality characteristics, as will be described below. In other words, for a weight ratio ω of 0, a user's input quality characteristics may be completely disregarded by the system when determining orientation and support layers. Conversely, when a weight ratio ω of 1 is selected, a user's input quality characteristics may be adhered to as closely as possible by the system when determining the orientation and support layers. In this way users may customize the weight ratio ω to a desired value to obtain desired print time and material costs, as balanced against surface quality desires for the object.

Notably, values associated with the text controls 270-278 may cause changes in a material cost (e.g., amount of material used) and time cost (e.g., estimated time to print ("TTP") estimate for printing of the object that may be provided to user. For example, as values of maximum bridging, weight ratio, overhang threshold etc. are changed, the material and time cost display 190 may be updated to reflect changes in material usage and print times resulting from changes to the text control values. In such an example, increasing the weight ratio ω toward 1 may cause print time and material cost to increase, whereas changing weight ratio ω toward 0 may reduce print time and material cost. Similarly, increasing a bridging distance may reduce material cost and print time, while decreasing bridging distance may have the opposite effect.

Checkboxes 280-288 may be provided to enable changing of the view within interface 175. For example, checkbox 286 may enable a user to view and interact with a wireframe of object 100 when checked, and when unchecked object 100 may be displayed normally. Similarly, point cloud checkbox 284 may be configured to enable the user to view and interact with the digital representation of the object 100 as a point cloud (i.e., a set of data points in space defining the object 100) when checked, and in normal view when unchecked.

Perspective checkbox 282 may be configured to enable a user to view and interact with the digital representation of the object in a perspective view when checked, and a two-dimensional, planar view when unchecked.

Saliency checkbox 280 may enable a user to view a saliency map generated by system 10 as, for example, a starting point for user input related to quality characteristics of the object 100. For example, when a user has not checked saliency checkbox 280 step 204: no), a digital representation of object 100 may be provided without display of a saliency map as at FIG. 2A (step 210).

When a user has checked saliency checkbox 280, (step 204: yes), based on the digital representation of the object 100 obtained by model input module 15 and displayed via interface 175, saliency determination module 25 may be configured to prepare a saliency map based on salient features of the object 100 (step 206). Salient features for purposes of the present disclosure refer to features that under typical consideration, an individual would find important for an object. For example, on a human face, curvature of the eyes, overhang of the nose and brow, as well as facial shape, among others would typically be considered salient features. Similarly, features defining shapes of the figurine, such as, for example curvatures and overhangs would be considered salient. One of skill in the art will understand that other salient features such as, for example, colors and textures, among others, may also be taken into consideration for purposes of preparing a saliency map.

Saliency determination module 25 may determine saliency in any suitable manner, for example, based on curve determination of a mesh at a vertex v as follows.

A curvature map C can be used to define a mapping from each vertex of a mesh to its mean curvature, e.g., C(v) can denote the mean curvature of vertex v within the mesh. A neighborhood N(v, σ) for a vertex v may be a set of points within a distance σ. Several distance functions may be used to define the neighborhood, such as a geodesic or a Euclidean distance. For purposes of the present disclosure, a Euclidean distance will be implemented, thus, where x is a mesh point, equation 1 can be used for defining the neighborhood N(v, σ).

$$N(v,\sigma)=\{x|\|x-v\|<\sigma\} \quad (1$$

A Gaussian weight average of mean curvature G(C(v), σ) may then be defined by equation 2.

$$G(C(v),\ \sigma)=\frac{\sum_{k\in N(v,2\sigma)}C(x)\exp[-\|x-v\|^2/(2\sigma^2)]}{\sum_{k\in N(v,2\sigma)}\exp[-\|x-v\|^2/(2\sigma^2)]} \quad (2$$

Saliency s of a vertex v may then be calculated as the absolute difference between the Gaussian weighted averages, as shown at equation (3.

$$s(v)=|(G(C(v),\sigma)-G(C(v),2\sigma)| \quad (3$$

According to some embodiments, saliency s may be determined at a plurality of different scales of the object 100, for example, using equation 4 where i corresponds to a particular scale level, and $s_i$ is the standard deviation of the Gaussian filter at scale i. The plurality of saliencies may then be combined by summing the saliency maps at all determined scales. According to some embodiments, such multi-scale calculations may be performed as described in Chang Ha Lee et al, "Mesh Saliency," ACM SIGGRAPH, pages 659-666 (2005), the contents of which are herein incorporated by reference.

$$s_i(v)=|(G(C(v),\sigma_i)-G(C(v),2\sigma_i)| \quad (4$$

Figure 2B:
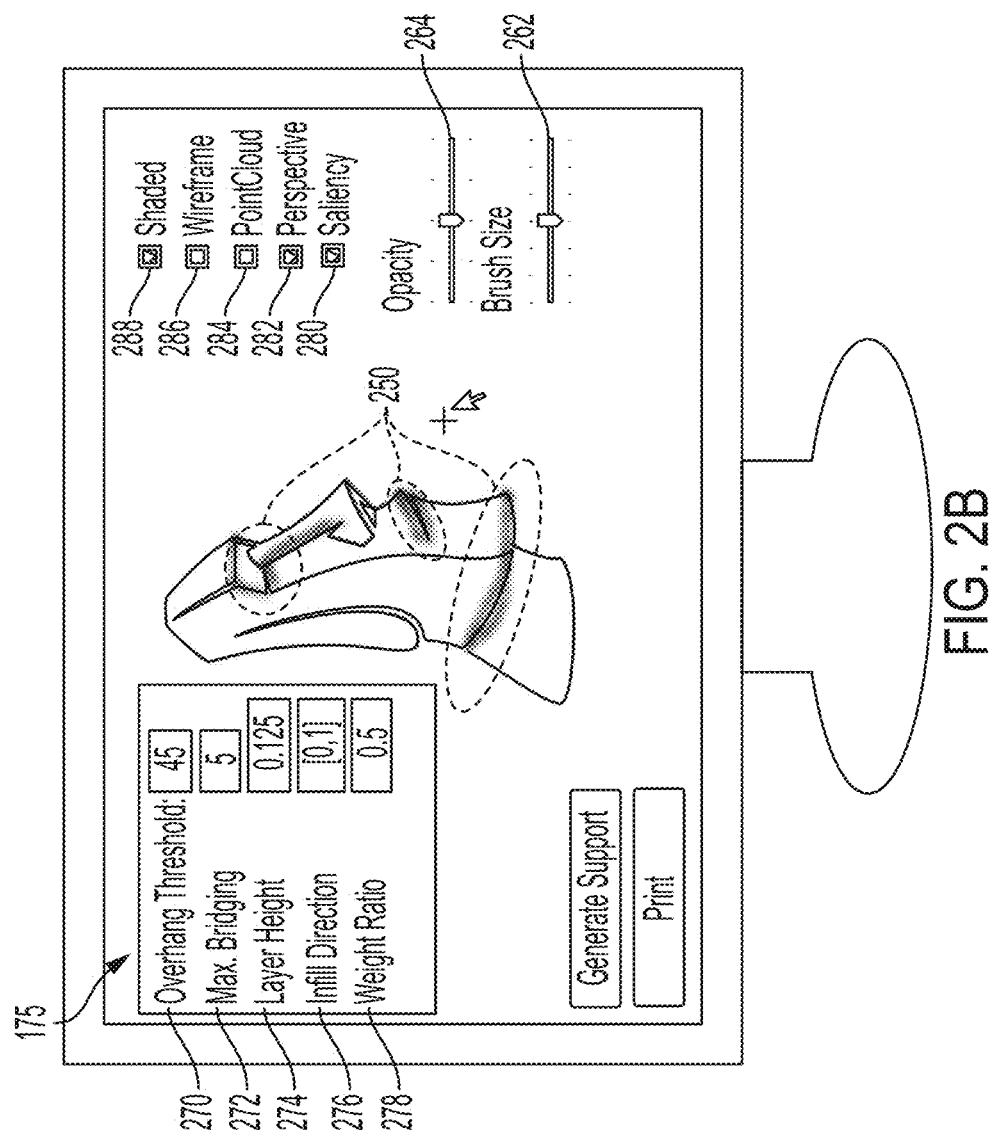
FIG. 2B shows the representation of FIG. 2A with an illustrative saliency map displayed on the representation of the object.

The digital representation of the object 100 may be provided to the user showing the saliency map 250 thereon when the saliency checkbox 280 is selected by the user. For example, as shown at FIG. 2B, a saliency map 250 for object 100 is shown as a gradient style "paint" effect on the digital representation of the object 100. The interface 175 may subsequently hide the saliency map 250 (i.e., not displayed) when the saliency checkbox 280 is unchecked, such that a user may interact with the digital representation of the object without influence from the saliency map 250. In other words, even if a saliency map 250 is initially generated based on user preference, the saliency check box 280 may be checked or unchecked to unhide and hide the saliency map 250 as desired. Alternatively, or in addition, an additional slider (not shown) may be implemented to allow a user to change intensity of a displayed saliency map 250 to meet the user's desire.

Figure 2C:
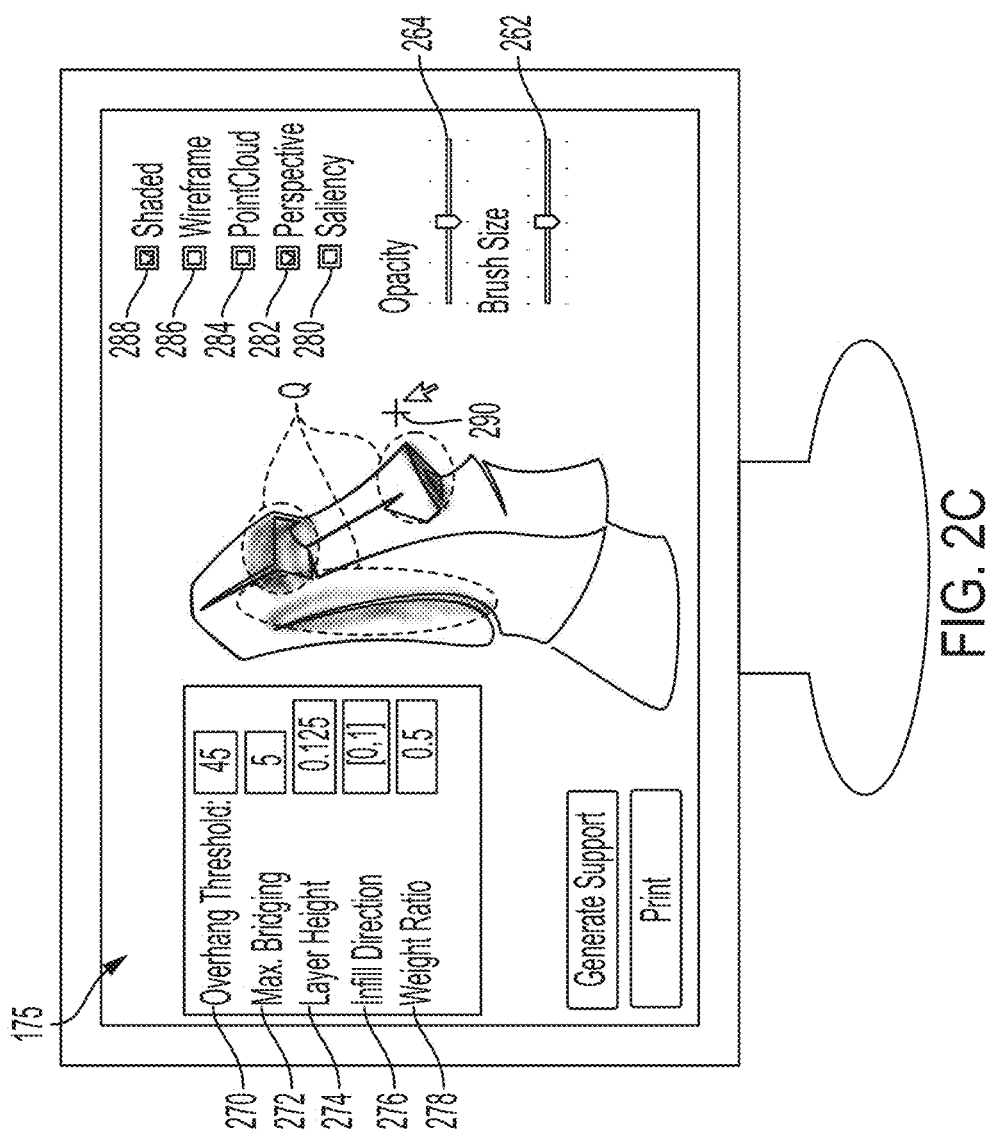
FIG. 2C shows the representation of FIG. 2A with user input indicating desired surface quality characteristics for the object as a quality field.

User input module 20 may be configured to receive user input (step 212) related to, for example, desired surface quality characteristics of areas/portions of the object 100 to define a quality field Q on the object 100. FIG. 2C shows the representation of FIG. 2A with user input indicating desired surface quality characteristics for the object 100 as a quality field Q. The user may interact with the digital representation of the object 100, with or without the saliency map 250 determined above, to indicate desired surface quality characteristics of areas of the object 100, among others. For example, a user may desire that certain portions of the object 100 have a higher surface quality than other, less important, portions of the object 100, and the quality field Q may be thereby defined with such user input.

Therefore, the interface 175, in addition to providing a visual representation of the object 100 to be 3D printed, enables a user to interact directly with the visual representation via an input device, e.g., a mouse, keyboard, touchscreen, stylus, drawing pad, etc. to "mark up" areas of importance with desired surface quality characteristics to form the quality field Q. For example, a user may use a mouse to point and click on areas of desired surface quality, while leaving other less important areas of the object 100 unmarked. Alternatively, or in addition, a finger of the user may be used to highlight various portions of the object 100 shown in the digital representation via a touchscreen. Any suitable method for enabling the user to indicate desired surface quality characteristics on the representation of object 100 is intended to fall within the scope of the present disclosure.

The quality field Q may be represented on the object 100 within the interface, for example, as a "paint effect" on the digital representation. According to some examples, the paint effect may be modified, and with it surface quality characteristics, based on, for example, a number of passes over the area, a pressure exerted on the area (e.g., a touchscreen), etc. For example, based on pressure exerted by a user's finger on a touchscreen, a gradient of the "paint effect" may be represented on the object, the gradient corresponding to the quality field Q defining varying surface quality characteristics for areas of the object 100.

According to such an example, greater pressure may be correlated with darker portions of the gradient, thereby corresponding to higher desired surface quality for indicated areas of object 100. According to another example, where a user inputs desired surface quality characteristics via a mouse, a greater number of passes and/or clicks of the mouse over an area may be correlated with a darker gradient, and thereby, higher desired surface quality for the area. Similarly, less pressure and/or fewer passes/strokes can be correlated with lighter gradient, and thereby, lower or less important surface quality. One of skill will recognize that the gradient of the "paint effect" may also operate inversely as desired, i.e., lighter gradient corresponding to higher quality and darker to lower quality. Gradient representation may also be inverted via a user preference (e.g., a checkbox or menu preference), as desired.

Further, for creating varying levels of importance for surface quality areas within the quality field Q, a user may actuate one or more controls within the interface 175 enabling variation of, for example, intensity related to surface quality characteristics. For example, opacity slider 264 and/or brush size slider 262 may enable a user to vary a level of intensity and/or "brush" size for strokes indicating desired surface quality characteristics on one or more surfaces, as described above.

Once a user has created a desired quality field Q for the object 100, the user may initiate a print operation to print the object 100 based on the digital representation and the quality field Q. The system in response begins preparation of an optimized orientation for printing of the object 100 (step 214) and determination of a corresponding support structure, taking into account the user indicated surface quality characteristics defined by the quality field Q (step 216).

Orientation Optimization

Orientation determination module 30 may be configured to determine a printing orientation of the object 100 considering, for example, material usage, user specified quality characteristics, build time and cost, and mechanical properties, among others. Notably, orientation determination module 30 may undertake a balancing of these illustrative factors when determining a printing orientation according to embodiments of the present disclosure.

Figure 3A:
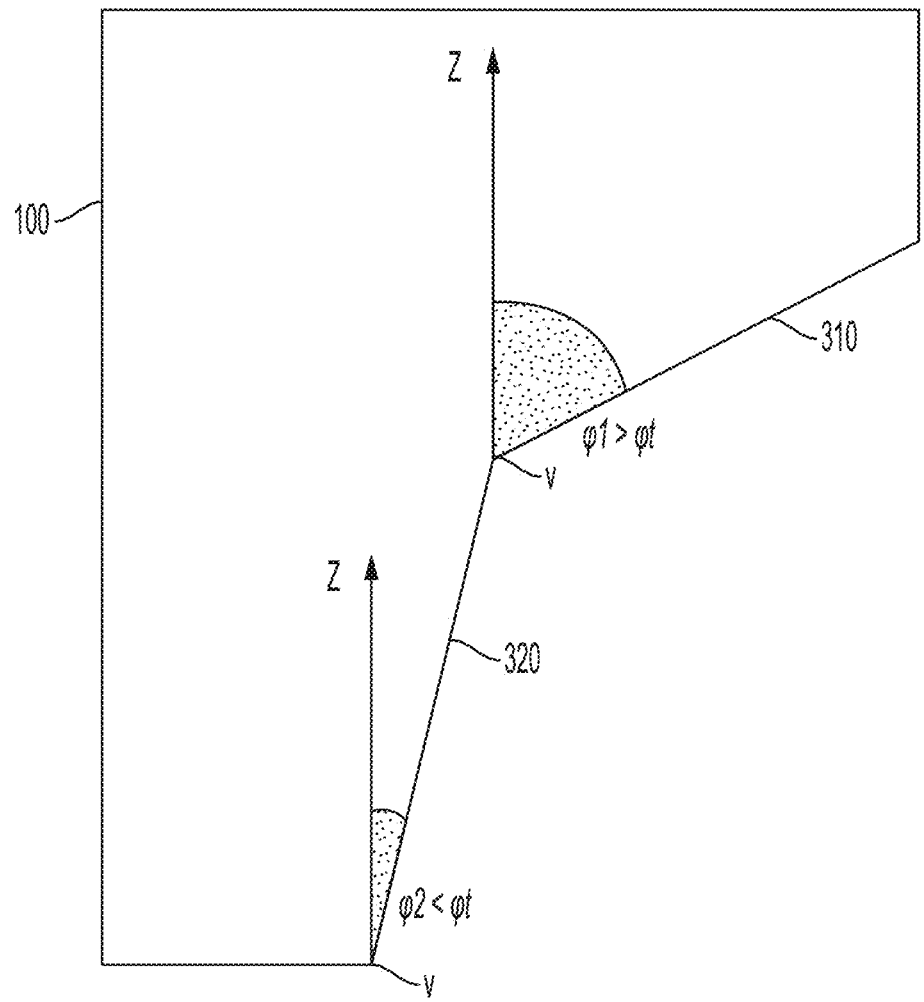
FIG. 3A is a diagram for explaining determination of an overhang for the 3D printed object.

FIG. 3A is a diagram for explaining determination of an overhang for the 3D printed object 100. A matrix V of vertices v present on the object 100 and determined for the saliency map 250 as described above, is used for determining one or more overhangs 310, 320 for which support may be desirable during the 3D printing of the object 100. To determine if an overhang area 310, 320 should be supported during printing, and therefore, include one or more support structures according to the present disclosure, the orientation determination module 30 may first determine how much the overhang tilts $\varphi$ from the build direction (i.e., the direction in which layers of the object 100 are printed). In FIG. 3A, the build direction is indicated as Z, and $\varphi$ may be measured relative to Z and compared to a threshold overhang angle, $\varphi_t$. If $\varphi$ the determined angle is greater than the threshold overhang angle $\varphi_t$, then orientation determination module 30 may determine that the presently analyzed overhang 310, 320 should be supported by support structures during the printing process. In contrast, where the current overhang angle $\varphi$ is less than the threshold overhang angle $\varphi_t$, the orientation determination module 40 may determine that support structures are not needed. Orientation determination module 30 may iterate across the entire mesh of the object 100 based on the vertex matrix V to determine a list of overhangs 310, 320 with support structure requirements.

Based on the determination of desired support for the one or more overhangs 310, 320, among others, the object 100 can be oriented for printing to minimize overhang surface area that have been identified as overhangs with desired support structures. This can be done by both minimizing contact surface area of supports with surfaces of the object 100, and by accounting for user preferences of surface quality characteristics as defined by the quality field Q determined from user input. Because overhangs 310, 320 are defined on mesh faces, the quality field Q can be mapped based on the mesh vertices to mesh faces by averaging over vertices of each face, as shown at equation 5. In equation 5, $q_j$ is the averaged quality value of face j, $n_v$ is the number of vertices on the face, and k is the vertex index.

$$q_j = \Sigma_k^{n_v} Q_k / n_v \qquad (5$$

In order to factor in cost for orientations, a cost function may be implemented as indicated at equation 6.

$$K_j = \begin{cases} 0, & \text{if } \varphi(\theta) \leq \varphi_t \\ (1-\omega)A_j + \omega A_j q_j^{1/p} \end{cases} \tag{6}$$

In equation 6, $\theta=[\alpha,\beta]$ represents rotations around z and x axes such that vertices v of the rotated mesh can be calculated as $V_r=R_x(\beta)R_z(\alpha)V$, where $R_z$ and $R_x$ are rotation matrices, V is the matrix storing vertex positions, $A_j \in [0, 1]$ is a normalized area of face j, p>0 is a penalization factor, for example, a value between 2 and 4 (e.g., 3) can be used, and $\omega \in [0, 1]$ is the weight ratio parameter selected by a user (e.g., manually via user interface 175).

When ω is chosen to be 0, optimization can minimize total contact area of support structures with the surface of object 100 without considering the quality field Q input by a user. In contrast, when ω is chosen as 1, contact areas of support structures overlapping with higher quality regions as indicated in the quality field Q are minimized.

Figure 3B:
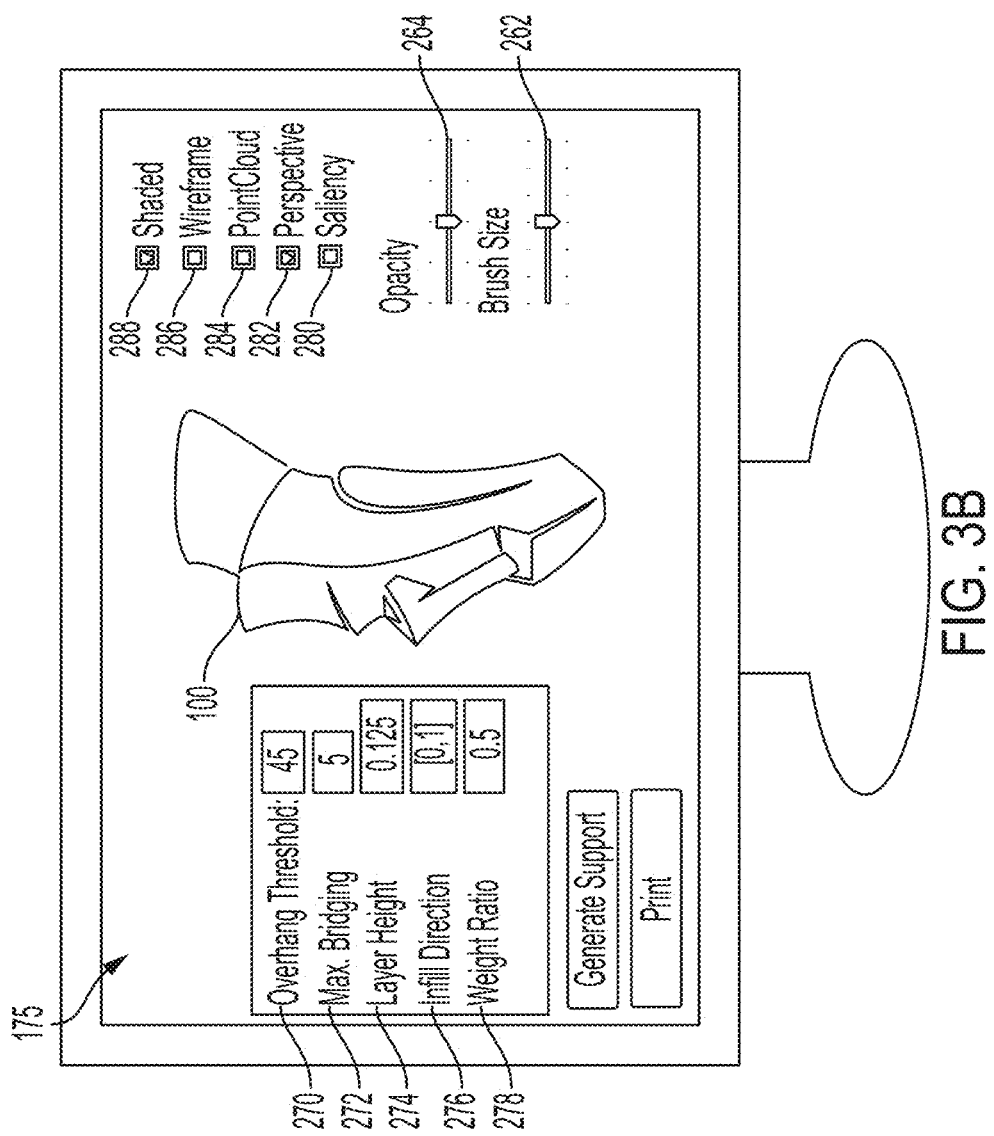
FIG. 3B is a schematic representation of the digitized object of FIG. 2 in a first orientation in preparation of printing with illustrative slicing in preparation for 3D printing.
Figure 3C:
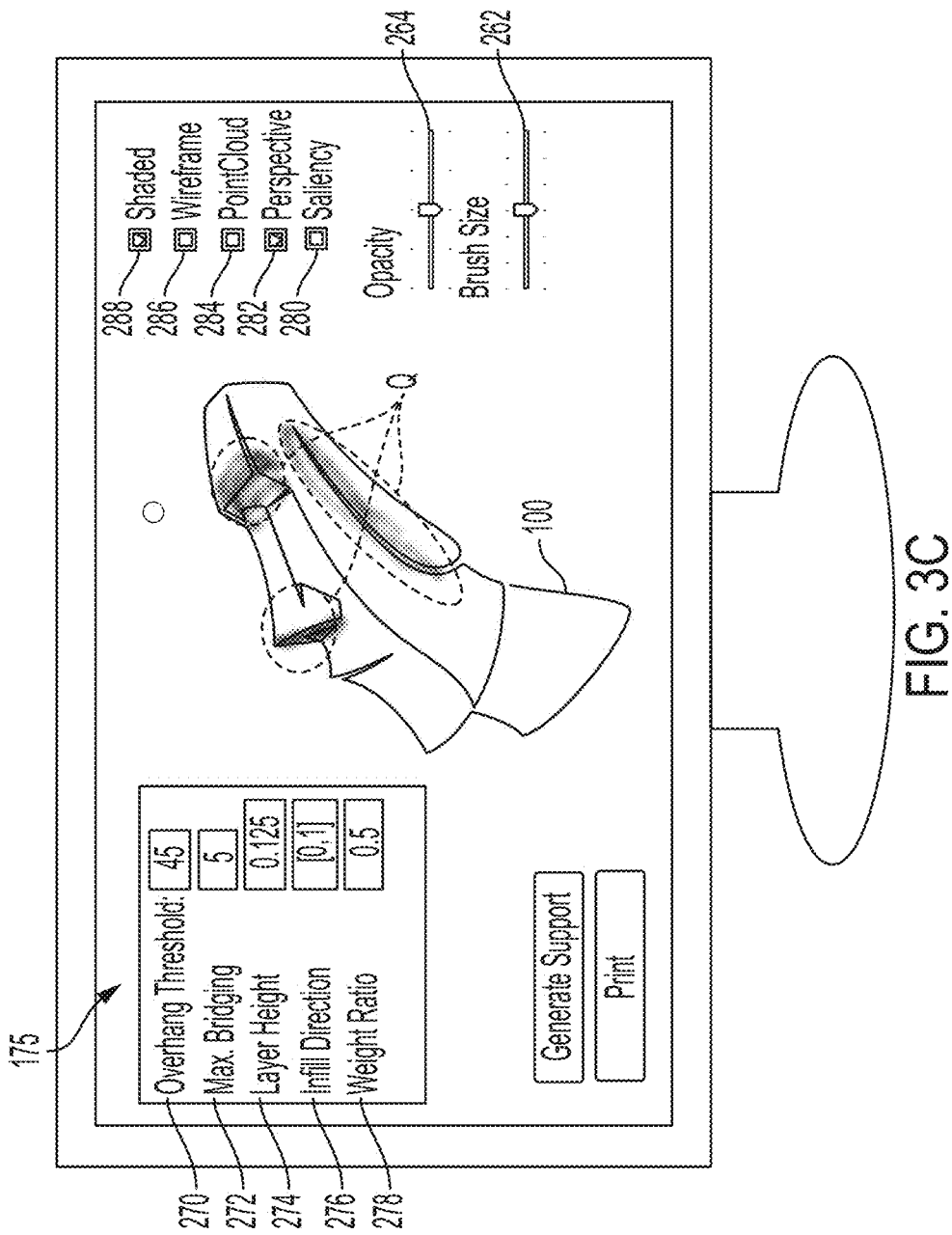
FIG. 3C is a schematic representation of the digitized object in an optimized orientation for 3D printing.

FIG. 3B is a schematic representation of the digitized object of FIG. 2 in a first orientation, while FIG. 3C is a schematic representation of the digitized object in an optimized orientation for 3D printing. Optimization by orientation determination module 30 may be configured to eliminate most if not all support contact at high quality regions as indicated within the user-defined quality field Q. For example, printing the object 100 upside down as shown at FIG. 3B, may result in minimal contact area (i.e., weight ratio ω approaching or equal to 0), however, this build orientation may not be as desirable as the orientation shown at FIG. 3C based on the quality field Q defined by the user.

Orientation determination module may therefore, determine the orientation using equation 7, where $n_F$ is the number of faces.

$$\min_\theta \sum_j^{n_F} K_j(\theta) \tag{7}$$

s.t. $\alpha \in [-\pi, \pi]$ $\beta \in [0, \pi]$

Based on this, only overhang angle j is recomputed for each objective evaluation as the object 100 is reoriented, and an optimization can be found quickly and with reduced computation power using only two optimization variables.

Orientation determination module 30 may then determine a global minimum after a sufficient number of iterations (e.g., between about 5,000 and 15,000 iterations, for example, 10,000 iterations) are performed, for example, using a simulated annealing method, and determine the optimized orientation based thereon.

Support Layer Determination

Figure 4A:
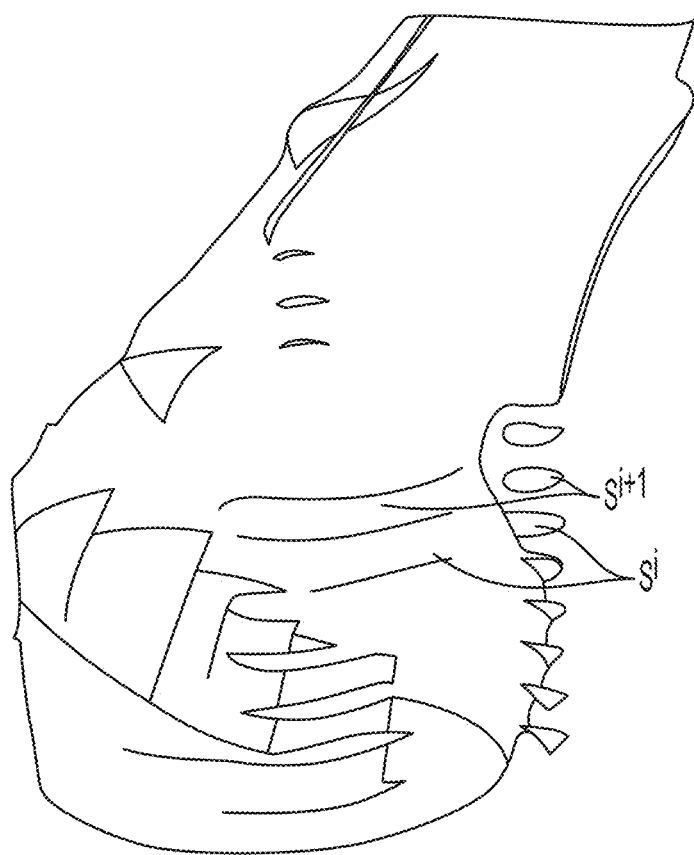
FIG. 4A is a schematic representation of the digitized object 100 showing illustrative slicing into layers and corresponding support polygons.

Once an orientation has been determined by orientation determination module 30, support layer determination module 35 may undertake creation of a support structure layer, represented as toolpaths, for object 100 (step 216). Toolpaths defining a support layer can be generated by support layer determination module 35 as, for example, connected streamlines generated in a bidirectional field B created inside a support polygon at each layer/slice of the object 100. FIG. 4A is a schematic representation of the digitized object 100 showing illustrative slicing into layers and corresponding support polygons S.

Figure 4B:
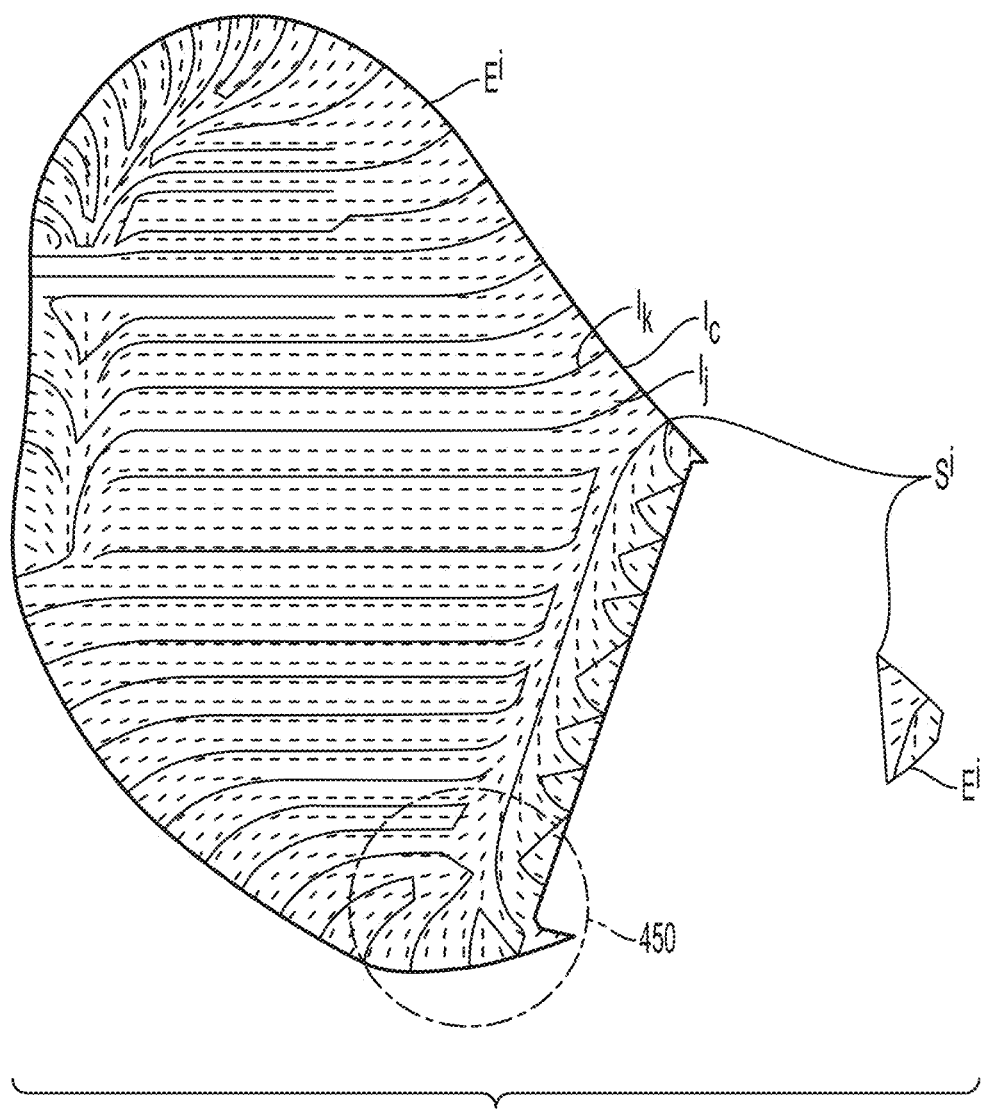
FIG. 4B is shows an illustrative slice/layer of FIG. 4A including completed streamlines/toolpaths defining a support layer.

FIG. 4B is shows an illustrative slice/layer of FIG. 4A including completed streamlines/toolpaths defining a support layer as determined based on the following. Support layer determination module 35 may construct a set of support polygons $S^i$ corresponding to a layer i with $T^{i+1}$ being a target slice $T^i$ of the object 100 supported by support polygon(s) $S^i$. Quality requirements as defined by the quality field Q and corresponding to an $i^{th}$ layer of support, $Q^i$ are first determined by the support layer determination module 35. For example, this may be performed by taking a slab of Q between the layers i and i+1, and projecting the quality values for each vertex v on the surface of the slab under consideration onto the $i^{th}$ layer. A set of samples on the perimeter and inside of the slice $T^{i+1}$ with corresponding scalar quality values is thereby generated.

Two fields may then be constructed, a scalar density field $D^i$ and a bidirectional field $B^i$, with the scalar density field $D^i$ corresponding to a linear interpolation of the quality samples determined above in $Q^i$, i.e., derived from the user input surface quality characteristics forming the quality field Q.

The bidirectional field may be obtained based on an interpolation of the boundary normals of the target slice $T^{i+1}$ and support polygon $S^i$ based on a predetermined infill direction. The predetermined infill direction may be provided as an option (e.g., x direction or y direction) for a user to choose (e.g., via the interface) or may be fixed as a user preference for all projects of a user, for example, via a menu item and/or application setting, as described above. Alternatively, the infill direction may be fixed for all projects, for example, based on an indicated user experience level.

For a 3D object with n slices, i.e., $i \in [0,n]$ where i=0 and i=n correspond to bottom and top slices/layers respectively, starting at n−1, the object may be processed down to i=0. Within each layer, if there is a non-empty set of support polygons $C^i = S^i \cap T^{i+1}$, support toolpaths in these areas should be provided to align with support toolpaths in the support polygon(s) $S^{i+1}$ in the layer above for a successful 3D print. To enable such alignment, the streamlines in the layer above support polygon(s) $S^{i+1}$ can be carried forth to the support polygons $S^i$ in the layer below, and these carried over streamlines may then be trimmed based on the curvature map $C^i$ for the support polygon(s) $S^i$ of the slice. New streamlines in the remaining region of the support polygons $S^i$ (i.e., those areas where streamlines have not been carried over from support polygons $S^{i+1}$) can then be created, $E^i = T^{i+1} \cap S^i$.

To create the bidirectional field $B^i$, the predetermined infill direction for the object 100 is represented as f and a vector perpendicular to the predetermined infill direction is represented as d. Streamlines generated inside support polygon(s) $S^i$ for a given slice should be perpendicular to both the perimeter of the supported slice/$T^{i+1}$ and the infill inside it. Therefore, a field complying with the boundary normals to the border of the current slice $E^i$ and d should be constructed. To do so, an effective infill region is determined by offsetting the boundary $E^i$ for the current slice inwards to create an offset polygon set $O^i$ for the current slice. Inside this offset polygon set $O^i$, the bidirectional field $B^i$ is aligned with the predetermined direction d. On the boundary of $E^i$, the field is constrained to be aligned with the normals.

The region bounded by the boundaries of $E^i$ and $O^i$ is considered to constitute a transition region where the bidirectional field $B^i$ orientation is obtained by linear interpolation. This allows obtaining of a smooth field inside the boundary $E^i$ to generate streamlines.

For bidirectional field interpolation, each vector may be represented with a smallest angle made by the considered vector with a predetermined fixed axis Γ.

The bidirectional fields $B^i$ allow singularities in the neighborhood of which the bidirectional field turns π radians. This means that the singularities may occur around Γ. To minimize the number of singularities in the resulting field, Γ may be selected along the infill direction $f$. As the interpolation may be between the boundary normals of $E^i$ and d, selecting Γ this way may maintain the active interpolation region away from any problematic areas.

In cases where $C^i \neq \emptyset$ for the slice, boundary normals of the support polygon(s) $S^i$ may be used while computing the bidirectional field $B^i$. This may enable expansion of the bidirectional field $B^i$ over the entire support polygon(s) $S^i$ and extend the streamlines towards $C^i$. This may be particularly useful when the support polygon(s) S (and therefore, the boundary E) is significantly small at a layer and gradually increases in size moving toward a bottom portion of the object 100. In such a case, streamlines for the boundary E become short in the top layers and can be "filtered out" (e.g., because it may not be possible to print such short paths), thereby effectively skipping that particular support layer. In the subsequent layers below it, extending streamlines throughout the entire support polygon(s) S allows for compensating for the "filtered out" streamlines and can prevent skipping of layers that have large support polygon(s) S to generate sufficiently long streamlines.

Spacing between adjacent streamlines may be locally controlled using the density field $D^i$ derived from the quality field Q. Streamlines may be generated by performing numerical integration of the bidirectional field $B^i$. Support layer determination module chooses a seed point for a new streamline at a separation distance $d_{sep}$ away from an existing streamline. As the streamlines are represented as series of points (i.e., polylines), this corresponds to offsetting a point along a streamline in its normal direction. Then, starting from the seed point, a new streamline is iteratively elongated in both directions until it: 1) meets the domain boundary (i.e., boundary of $S^i$); 2) reaches to a singular point where magnitude of the field is close to 0; or 3) comes closer to another existing streamline than a predetermined threshold distance $d_{test}$. According to some embodiments $d_{test}$ may be set as a fraction of $d_{sep}$, for example, $d_{test}$ may be set between 0.6 and 0.8 of the separation distance $d_{sep}$ (e.g., 0.7 $d_{sep}$).

Streamline generation may be stopped when there are no further valid seed points. Notably, support layer determination module 35 may select an arbitrary point on the boundary of $E^i$ as the starting seed point to initialize the process. To avoid leaving large gaps or skipping unconnected components of $S^i$, support layer determination module may implement additional seed points placed on a regular grid created inside the bounding box of the support polygon $S^i$.

Support layer determination module 35 may adapt local spacing between the streamlines by determining $d_{sep}$ according to equation 8.

$$d_{sep} = d_{min} + (1 - D^i(x,y))(d_{max} - d_{min}) \quad (8$$

In equation 8, $D_i(x,y) \in [0,1]$ is the value of the density field D at a location (x,y), and $d_{min}$ and $d_{max}$ are minimum and maximum allowed spacing between the streamlines, respectively. The maximum spacing, $d_{max}$, may be determined based on the object and/or the process, and may correspond to the maximum distance for successful bridging of the support (i.e., the maximum distance before anticipated failure/collapse of the portion supported by the support structure). The minimum spacing, $d_{min}$ may be 0, corresponding to solid filling of the support area, however, in practical implementations, and to save material and avoid undesirably strong adhesion between the support layer and the object surfaces, $d_{min}$ may be set to a value greater than 0, e.g., 0.3 ($d_{max}$). The predetermined threshold value $d_{test}$ set as a percentage of $d_{sep}$ may be used to reduce constraints on streamline generation and enables longer streamlines by increasing the minimal distance at which integration of the streamline will be terminated. Setting the test distance $d_{test}$ to 0.7 of the separation distance $d_{sep}$ can provide a good balance between obtaining longer streamlines and having stricter control on the spacing between streamlines.

Integration of the streamlines may be performed by any suitable integrator method. For example, according to some embodiments, a fixed step Euler integrator where each new point of a streamline is calculated as $p_{k+1} = p_k + h\bar{b}(pk)$. Here, h is the integration step and $p_k$ is the last point of the streamline, while $\bar{b}(pk)$ represents the unit direction vector at point $p_k$ and it is obtained from the bidirectional field $B^i$. Because $B^i$ is bidirectional, there are two possible directions to extend the streamline at any arbitrary point $p_k$. According to the present example, $B^i(p_k) = \{+b, -b\}$ where b is a vector. Among the two possible direction, the direction that deviates the least from the previous step is selected as in equation 9.

$$\bar{b}(pk) = \underset{x \in B^i(p_k)}{\mathrm{argmax}}\,(p_k - p_{k-1})x \quad (9$$

To avoid streamline making abrupt turns that may be unsupported by a printing toolhead, support determination module 35 may stop the integration when the angle between $\bar{b}$ and the last line segment of the streamline is larger than a certain threshold, for example, π/3 radians may be selected as the threshold value.

When $C^i \neq \emptyset$, the streamlines that are carried over from the previous support polygon $S^{i+1}$ may be elongated before starting to generate new streamlines in $E^i$. For this purpose, end points of carryover streamlines can be used as seed points for the integration. New seed points may then be created by offsetting the elongated streamlines.

Streamlines in each support polygon $S^i$, may then be connected to neighboring streamlines to generate long and continuous paths, of which at least a portion conforms to a contour of the object 100 to be printed. To enable connection and contouring to the borders of the object 100, streamlines may be trimmed to the boundary of the support polygon $S^i$ for a layer. Then, starting from a shortest streamline of the support polygon $S^i$, support determination module 35 may check each streamline $l_j$ in order and connect the checked streamline $l_j$ to another yet unconnected streamline $l_k$ in close proximity (e.g., within a distance of approximately equal to $2 \ast d_{sep}$, $3 \ast d_{sep}$, or even $4 \ast d_{sep}$) with a connecting streamline $l_c$. In order to obtain a successful connection $l_c$ between a considered streamline $l_j$ and a streamline in proximity $l_k$, support layer determination module 35 may evaluate the following criteria: i) an end point of the considered streamline $l_j$ is sufficiently close to an end point of the streamline $l_k$ in proximity, (ii) a path connecting the considered streamline $l_j$ to the streamline $l_k$ in proximity does not intersect with other streamlines or other connecting paths and (iii) the path connecting the considered streamline $l_j$ to the streamline $l_k$ in proximity does not leave the boundaries of the current support polygon $S^i$.

When a successful connection $l_c$ is established between and $l_k$, extension of the connection can be continued from the opposite end of $l_k$ until there are no more valid connections, as defined above, available.

Support layer determination module 35 may create two types of connecting paths $l_c$ between streamlines 1, straight paths and boundary (contour) following paths. Straight paths may be created when the connecting end points of both the current streamline and the streamline in proximity $l_k$ lie within the current support polygon $S_i$. In this case, end points of each streamline $l_j$ and $l_k$ are connected with a straight, uncontoured line.

Figure 4C:
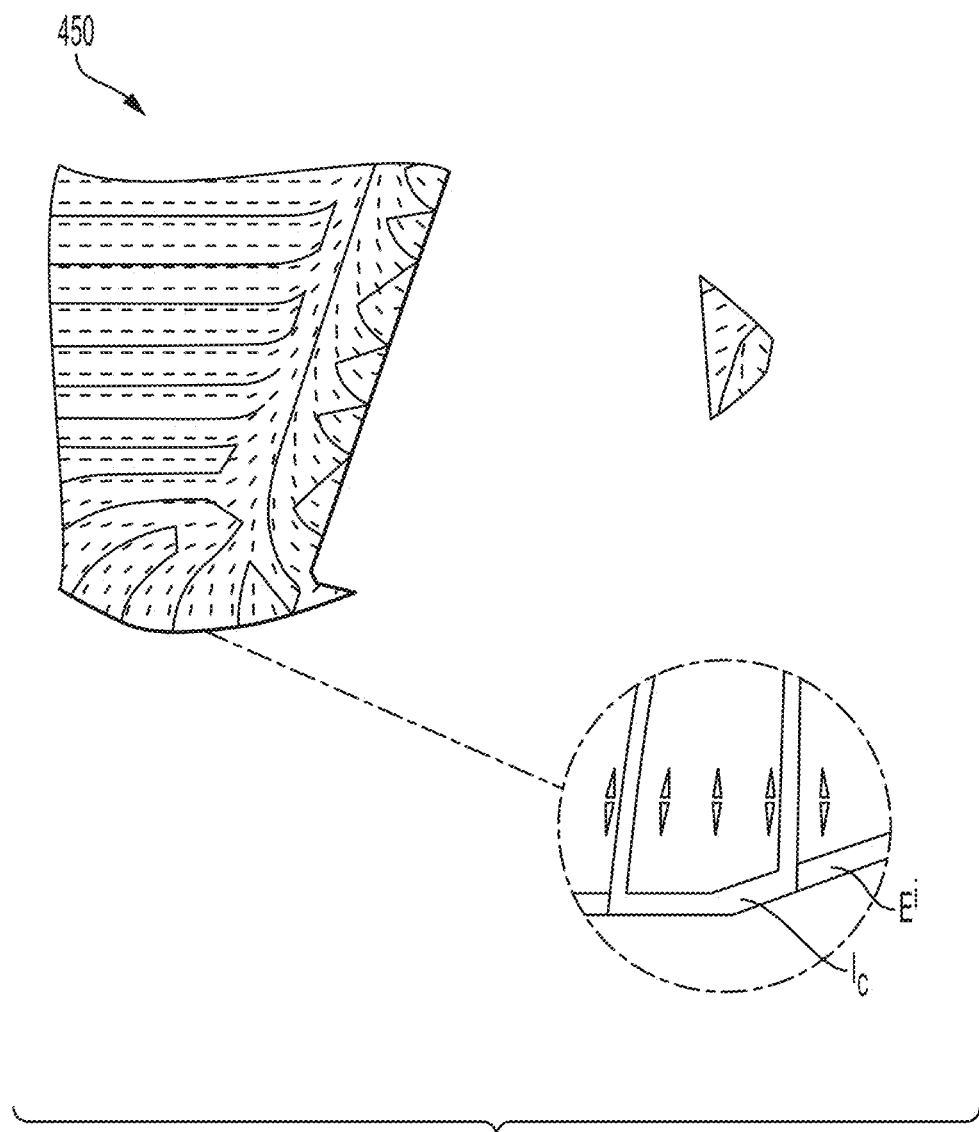
FIG. 4C highlights a "contoured" tool path at a boundary of a support polygon shown at FIG. 4B.

Support layer determination module 35 may create contoured paths when the connecting end points of streamlines $l_j$ and/or $l_k$ fall on the boundary $E^i$ of the support polygon $S^i$. In this case, support layer determination module 35 may implement a shortest boundary segment connecting the two points as the connecting path. This may allow creation of connected streamlines corresponding to toolpaths that support the perimeters of the object 100 while also maintaining boundary details. FIG. 4C highlights an illustrative portion 450 of such "contoured" tool paths at the boundary $E^i$ of the support polygon $S^i$ shown at FIG. 4B.

For slices where $C^i \neq \emptyset$, support layer determination module 35 may not carryover the connecting paths and may then re-evaluate the connections after all the streamlines are created in the current support polygon $S^i$. This technique may provide better connections after the carryover streamlines are extended in the next subsequent layer. In other words, shorter connection distances may be obtained following this technique.

According to some embodiments, support layer determination module 35 may be configured to smooth streamlines around junction points using Laplacian smoothing Using this technique, the support layer toolpaths paths may be improved for fused filament fabrication type printing, for example, by limiting issues related to acceleration/deceleration of a print toolhead at sharp corners. This can also improve print times.

Toolpath Code Generation

The 3D printer communication module 45 may be configured to receive support layer information, including the streamlines generated above, and to create machine instructions for a 3D printer enabling printing of the object 100 along with the support layers.

The 3D printer communication module 45 may compile machine instructions in the form of, for example, commonly accepted gcode. Both support toolpaths and the target object toolpaths may be compiled together for all layers. The 3D printer communication module 45 may use any suitable method for compiling the toolpaths into gcode. For example, the open source slicer gsSlicer may be implemented to generate toolpaths for the target object as well as to convert all the streamlines/toolpaths to gcode for sending to a desired 3D printer.

Hardware and Software

Figure 6:
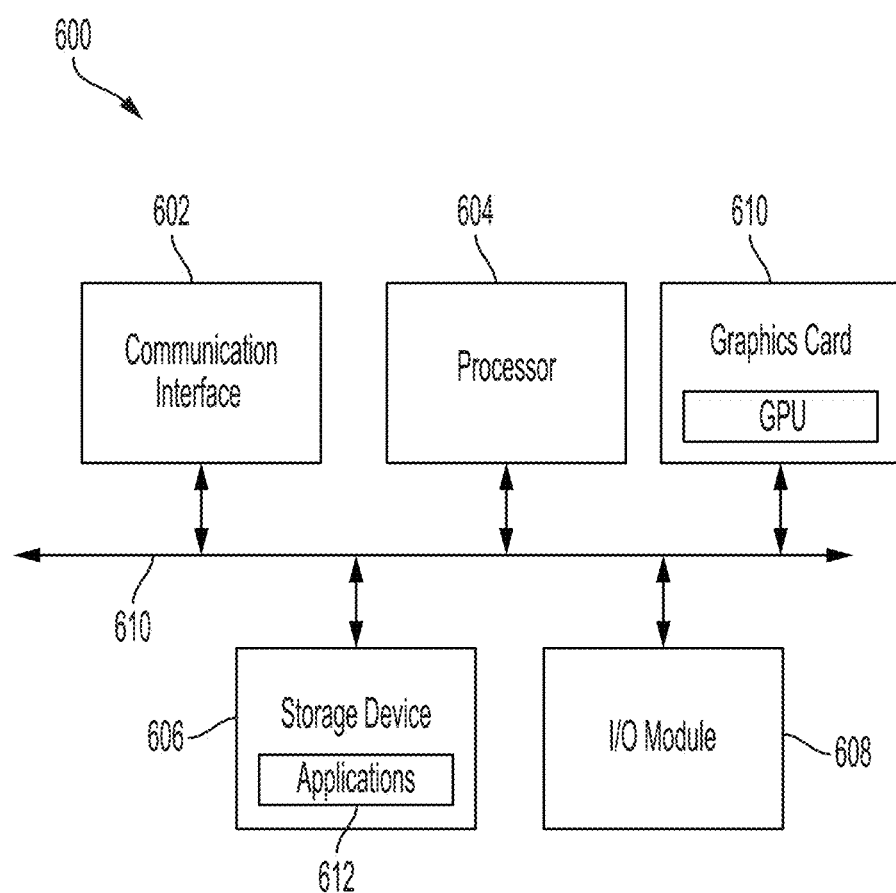
FIG. 6 illustrates a computing device that may be specifically configured to perform one or more of the processes described herein.

FIG. 6 illustrates an exemplary computing device 600 that may be specifically configured to perform one or more of the processes described herein.

As shown in FIG. 6, computing device 600 may include a communication interface 602, a processor 604, a storage device 606, and an input/output ("I/O") module 608 communicatively connected via a communication infrastructure 610. While an exemplary computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may include one or more I/O modules configured to receive user input and provide user output. One or more I/O modules may be used to receive input. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

Model input module 15, user input module 20, saliency determination module 25, orientation determination module 30, support layer determination module 35, digital rendering module 40, and 3D printer communication module 45 may be implemented in any suitable manner and with any suitable development tool. For example, the modules may be coded in any suitable language, including, but not limited to, C, C++, Java, Basic, Python, etc. Further, any suitable framework may be used for implementing the modules. For example, the .NET framework provided by Microsoft Corporation, the XCode framework provided by Apple, Inc., and/or the JRE framework provided by Oracle Corporation.

Modules implemented herein need not be implemented in one single, uniform language, and certain modules may be implemented in a first language and/or framework, while other modules may be implemented in another, second language and/or framework. For example, the user interface and module input module 15 may be implemented in C++, while the support layer determination module 35 may be implemented in Python.

Additionally, one or more tools and/or APIs provided by such tools may be implemented for performing certain operations defined in the present disclosure. For example, a first tool providing an API for geometric operations may be used in combination with a second tool may be implemented for performing interpolations and integrations as described above for determining streamlines and connections between streamlines.

The implemented modules may be more or fewer than those noted with regard to FIG. 1. For example, model input module 15 and user input module 20 may be combined within a single module, while saliency determination module 25, orientation determination module 30, and support layer determination module 35 may also be combined.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

It is intended that the specification and examples be considered as exemplary only, with a true scope of the disclosure being indicated by the following claims.

What is claimed is:

1. A system for interactively designing a support structure for a three-dimensionally printed object having user-defined surface quality, the system comprising:
   a processor;
   a non-transitory computer-readable medium communicatively coupled to the processor and storing instructions that when executed by the processor are configured to cause the processor to perform operations comprising:
   receiving a digital model of the object to be three-dimensionally printed;
   receiving user input related to a desired surface quality at one or more portions of the digital model;
   determining a printing orientation of the object based on the digital model and the user input;
   determining a support layout for the object, based on the printing orientation and the user input;
   providing a representation of the digital model to the user via a graphical user interface;
   providing a saliency map on the representation based at least on a user preference and one or more curves present on the digital model; and
   transmitting the support layout, the printing orientation, and the digital model to a three-dimensional printer.

2. The system of claim 1, wherein the operations further comprise:
   receiving the user input based on interaction of the user with the representation via the graphical user interface.

3. The system of claim 1, wherein the saliency map may be hidden based on the user preference.

4. The system of claim 2, the operations further comprising displaying, on the representation, a gradient map corresponding to anticipated surface quality of at least a portion of the object.

5. The system of claim 1, the operations further comprising providing a real-time estimate of a material cost for printing of the object based on the support layout, the printing orientation, and the digital model.

6. The system of claim 1, the operations further comprising:
   receiving user input of a desired weight ratio corresponding to a surface quality to support area; and
   optimizing the support layout based on the weight ratio.

7. The system of claim 1, wherein in the support layout, a support structure density corresponds directly with an indication of surface quality.

8. The system of claim 1, wherein the support layout includes one or more support structures conforming, at least in part, to one or more curves of the object.

9. The system of claim 1, wherein the three-dimensional printer is selected from a fused filament fabrication printer, a fused deposition modeling printer, a stereolithography printer, and a direct energy deposition printer.

10. A method for interactively designing a support structure for a three-dimensionally printed object having user-defined surface quality, comprising:
    receiving a digital model of the object to be three-dimensionally printed;
    receiving user input related to a desired surface quality at one or more portions of the digital model;
    determining a printing orientation of the object based on the digital model and the user input;
    determining a support layout for the object, based on the printing orientation and the user input;
    providing a representation of the digital model to the user via a graphical user interface;
    providing a saliency map on the representation based at least on a user preference and one or more curves present on the digital model; and
    transmitting the support layout, the printing orientation, and the digital model to a three-dimensional printer.

11. The method of claim 10, further comprising:
    receiving the user input based on interaction of the user with the representation via the graphical user interface.

12. The method of claim 10, further comprising hiding the saliency map based on a user selection.

13. The method of claim 11, further comprising displaying, on the representation, a gradient map corresponding to anticipated surface quality of at least a portion of the object.

14. The method of claim 10, further comprising providing a real-time estimate of a material cost for printing of the object based on the support layout, the printing orientation, and the digital model.

15. The method of claim 10, further comprising:
    receiving user input of a desired weight ratio corresponding to a surface quality to support area; and
    optimizing the support layout based on the weight ratio.

16. The method of claim 10, wherein in the support layout, a support structure density corresponds directly with an indication of surface quality.

17. The method of claim 10, wherein the support layout includes one or more support structures conforming, at least in part, to one or more curves of the object.

18. The method of claim 10, wherein the three-dimensional printer is selected from a fused filament fabrication printer, a fused deposition modeling printer, a stereolithography printer, and a direct energy deposition printer.

* * * * *